US012767442B2

(12) United States Patent
Preschke

(10) Patent No.: US 12,767,442 B2
(45) Date of Patent: Oct. 20, 2026

(54) EXTRACTOR DEVICE WITH SECURING DEVICE, TRACTION DRIVE AND CARRIAGE AND STORAGE SYSTEM HAVING SUCH AN EXTRACTOR DEVICE AND METHOD

(71) Applicant: Kardex Produktion Deutschland GmbH, Neuburg/Kammel (DE)

(72) Inventor: Harald Preschke, Vohringen (DE)

(73) Assignee: Kardex Produktion Deutschland GmbH, Neuburg/Kammel (DE)

( * ) Notice: Subject to any disclaimer, the term of this patent is extended or adjusted under 35 U.S.C. 154(b) by 326 days.

(21) Appl. No.: 18/425,766

(22) Filed: Jan. 29, 2024

(65) Prior Publication Data

US 2024/0166438 A1 May 23, 2024

Related U.S. Application Data

(63) Continuation of application No. PCT/EP2022/071380, filed on Jul. 29, 2022.

(30) Foreign Application Priority Data

Jul. 30, 2021 (DE) ......................... 102021119925.5

(51) Int. Cl.
*B65G 1/04* (2006.01)

(52) U.S. Cl.
CPC .................................. *B65G 1/0492* (2013.01)

(58) Field of Classification Search
CPC .................................................... G65G 1/0492
See application file for complete search history.

(56) References Cited

U.S. PATENT DOCUMENTS 4,478,329 A 10/1984 Heiz
2005/0063801 A1* 3/2005 Durand .................... B65G 1/06
414/268

(Continued)

FOREIGN PATENT DOCUMENTS

CN 1749131 A 3/2006
DE 4233690 A1 4/1994

(Continued)

OTHER PUBLICATIONS

Bargiotas, Dimitrios, et al. “A scalable low-cost automated storage & retrieval system.” 2009 16th International Conference on Systems, Signals and Image Processing. IEEE, 2009. (Year: 2009).*

(Continued)

*Primary Examiner* — Emmett K. Walsh
(74) *Attorney, Agent, or Firm* — Edell, Shapiro & Finnan, LLC

(57) ABSTRACT

The invention relates to an extractor device for transferring a storage-article carrier from or into a storage position of a storage system, and a storage system having such an extractor device. A space-saving extractor device is provided with a carriage, with a traction drive, with an extractor framework, and with a securing device. The traction drive has a tensioning means. The carriage has at least one deflection location of the traction drive. The carriage and the traction drive are arranged so as to be movable on the extractor framework. By means of the securing device, a portion of the tensioning means, or alternatively the carriage, is blocked with respect to the extractor framework.

15 Claims, 4 Drawing Sheets

(56) References Cited

U.S. PATENT DOCUMENTS

| | | | | |
|---|---|---|---|---|
| 2015/0023772 | A1* | 1/2015 | Beer .................... | B65G 1/0492<br>414/751.1 |
| 2021/0171228 | A1 | 6/2021 | Almogy | |

FOREIGN PATENT DOCUMENTS

| | | | |
|---|---|---|---|
| DE | 60300107 | T2 | 12/2005 |
| DE | 102013011860 | A1 | 1/2015 |
| EP | 2826731 | B1 | 10/2016 |
| GB | 1476085 | A | 6/1977 |
| JP | H082620 | A | 1/1996 |
| WO | 2020203097 | A1 | 10/2020 |

OTHER PUBLICATIONS

International Search Report for International Patent Application No. PCT/EP2022/071380 mailed Dec. 12, 2022, 4 pages.

German Search Report for Application No. 10 2021 119 925.5, dated Apr. 11, 2022, 12 pages with machine-generated English translation.

Office Action for Chinese patent application No. 202280053122.X from the Chinese Patent Office with English translation dated Feb. 10, 2026, 19 pages.

* cited by examiner

EXTRACTOR DEVICE WITH SECURING DEVICE, TRACTION DRIVE AND CARRIAGE AND STORAGE SYSTEM HAVING SUCH AN EXTRACTOR DEVICE AND METHOD

FIELD OF INVENTION

The invention relates to an extractor device for transferring a storage-article carrier from or into a storage position of a storage system.

BACKGROUND

Extractor devices are known, for example, from DE 42 33 690 A1 and DE 20 305 123 U1. However, the disadvantage of these extractor devices is that they require a relatively large amount of space in the storage shaft in which they move. The storage systems configured with these extractor devices therefore take up an unnecessarily large amount of space.

SUMMARY

It is the object of the invention to provide an extractor device which allows a storage system to be configured in a more compact and space-saving manner.

According to the invention, this problem is solved by an extractor device for transferring a storage-article carrier from or into a storage position of a storage system, with a carriage, with a traction drive which has a pulling means and at least one deflection location for the pulling means arranged on the carriage, with an extractor framework on which the carriage and the traction drive are movably arranged, and with a securing device by which either at least one portion of the pulling means or the carriage is blocked with respect to the extractor framework.

This problem is also solved by a method for transferring a storage-article carrier from a storage position of a storage system to an extractor device and/or from the extractor device to the storage position by means of a traction drive having a pulling means and a carriage deflecting the pulling means, both of which are arranged on an extractor framework of the extractor device so as to be movable relative to the extractor framework, wherein selectably the carriage is blocked with respect to the extractor framework or at least a portion of the pulling means is blocked with respect to the extractor framework and the storage-article carrier is moved by means of the traction drive, or at least a portion of the pulling means is blocked with respect to the extractor framework and the carriage is moved by the traction drive.

The combination of traction drive, carriage and securing device according to the invention allows the clear width of the storage shaft to be reduced, as the extractor device according to the invention is less deep. By extending the carriage, the traction drive can be brought into position for access to a storage position. If in fact the carriage is fixed with respect to the extractor framework, the traction drive runs around the carriage, which is stationary with respect to the extractor framework, and can be used to move a storage-article carrier with respect to the extractor framework. If, on the other hand, the at least one portion of the pulling means is blocked or, equivalently, fixed with respect to the extractor framework, the carriage is moved by the traction drive with respect to the extractor framework. In this case, the traction drive acts like a track chain drive that drives the carriage.

In contrast, in the extractor devices of DE 42 33 690 A1 and DE 20 305 123 U1, the traction drive remains permanently in a position that allows access to a storage position, so that correspondingly more space is required.

The invention is particularly preferred for storage systems in which the extractor device moves vertically and/or horizontally in the storage shaft, as the carriage can easily bridge the gap between the storage-article carriers and the extractor device required to move the extractor device in the storage shaft.

The invention can be further improved by the following features, each of which is individually preferred and can be combined with one another as desired. The features can be used indiscriminately to improve the extractor device, to improve the storage system and/or to improve the method.

Thus, according to a preferred configuration, the extractor device can have a drive by means of which when the pulling means is blocked in sections with respect to the extractor framework, the carriage is moved and when the carriage is blocked with respect to the extractor framework, the traction drive is moved relative to the extractor framework. This arrangement allows the storage-article carrier to be moved by the traction drive when the carriage is blocked and the carriage to be moved by the same drive when the pulling means is blocked in sections. The traction drive does not have to be moved as a whole relative to the extractor framework when the carriage is blocked. It is also possible to move only part of the traction drive relative to the extractor framework.

The blocked portion is preferably located on a working strand of the traction drive. The working strand of the pulling means is the portion of the traction drive that engages with and moves the storage-article carrier when the storage-article carrier is transferred. If this portion is blocked, the pulling means in the working strand does not move with respect to the extractor framework or a storage-article carrier in the storage position.

In a preferred configuration, a single, common drive is provided for a carriage and a traction drive. The drive is preferably part of the traction drive and drives the pulling means of the traction drive. The drive, for example an electric motor, can be located on the extractor framework or on the carriage or can be attached to the extractor framework or to the carriage. However, an arrangement on the extractor framework is preferred because the moved mass of the carriage is then smaller. The extractor framework preferably carries the carriage and the traction drive as well as the drive.

With the pulling means blocked in sections with respect to the extractor framework, the carriage is preferably moved or driven by the traction drive relative to the extractor framework. A movement of the carriage is preferably purely translational and can, in particular, take place in a horizontal plane. The extractor framework can have guides, for example in the form of rails or other profiles, which guide the carriage translationally. A combined rotational and translational movement of the carriage is also possible if, for example, the carriage is to perform a dipping movement away from or towards the storage position.

The securing device is preferably attached to the extractor framework and is configured such that it can be engaged selectably (in the sense of either-or) or equivalently alternately or alternatively with the carriage or the pulling means. Thus, in such a configuration, if the securing device is engaged with the carriage, the securing device is disengaged from the traction drive; if the securing device is engaged with the traction drive, it is disengaged from the carriage.

The securing device can be configured to be switchable between a first coupling position and a second securing position, wherein in the first securing position the at least one portion of the pulling means is blocked with respect to the extractor framework and the carriage can be moved, driven by the traction drive, with respect to the extractor framework and in the second securing position the carriage is blocked or fixed with respect to the extractor framework and the traction drive is driven movably with respect to the extractor framework and with respect to the carriage.

In one configuration, the securing device can have one securing element which can be brought alternately into engagement with the carriage and the pulling means. In another configuration, the securing device can have two securing elements which are configured to be moved alternately into engagement with the carriage and the traction drive. The at least one securing element can be translationally or rotationally movable and driven, for example, magnetically, pneumatically, hydraulically and/or by an electric motor.

The traction drive is preferably only blocked or can be blocked at a single portion of the pulling means by the securing device or, if present, by the securing element. Securing at several portions or over a larger portion of the pulling means is not necessary. Consequently, a securing element that can be brought into engagement with a carriage and/or traction drive, for example, does not need to have large dimensions. A small securing element has the advantage that it can be moved quickly due to its low weight and requires little additional space.

At the at least one deflection location located on the carriage, the traction drive can be deflected by a rotating part, such as a gearwheel or a roller, or in a sliding manner, for example by a sliding shoe. Preferably, there are at least two deflection locations on the carriage, which are spaced apart from each other, particularly in the horizontal direction or in the direction of movement of the carriage. This simplifies to constructively implement a movement of the carriage in two directions. In particular, the deflection locations can be located at opposite ends of the carriage, especially in a horizontal direction. The ends are thereby preferably in the direction of movement of the carriage. More than two deflection locations can also be arranged on the carriage.

The pulling means is looped around the at least two deflection locations on the carriage, preferably by more than 180°, more preferably by at least 270°. In particular, two or more deflection locations are arranged between two opposite portions of the pulling means in the direction of movement of the carriage.

At least one deflection location of the traction drive, preferably a drive roller, a drive wheel or a drive pulley, is attached to the extractor framework.

In a preferred configuration, at least two deflection locations are arranged on the carriage and at least one deflection location on the extractor framework.

The at least one portion on which the pulling means is secured, or the securing device, in particular its securing element, is preferably located between two deflection locations arranged on the carriage. The drive of the traction drive is preferably located between two deflection locations of the carriage, wherein at least one deflection location arranged on the carriage is located between the drive and the at least one portion at which the securing device engages with the traction drive or the pulling means or secures the traction drive or the pulling means with respect to the extractor framework. The drive of the traction drive is preferably located at an empty strand of the pulling means, thus at a point at which the pulling means does not come into engagement with the storage-article carrier.

In order to save space, the carriage can be located in sections in a plane spanned by the pulling means, so that it is located in the area looped by the pulling means. The securing device can also be arranged in an area looped by the pulling means, or at least the securing element can be located in this area. The plane spanned by the pulling means is preferably a vertical plane, thus preferably runs parallel to the direction of gravity.

The carriage can have a plurality of, in particular, discrete engagement locations spaced apart from one another in a direction of movement of the carriage, at which the securing device can be brought into engagement with the carriage at different positions of the carriage with respect to the extractor framework. This allows the carriage to be secured at predetermined positions with respect to the extractor framework. Such a predetermined position can, for example, be a transport position in which the extractor device with a storage-article carrier carried by it is movable or moved through the storage system, for example a storage shaft of the storage system. Another engagement location can determine a transfer position of the carriage at which the extractor device takes over the storage-article carrier in the storage position or transfers it to the storage position or comes into and out of engagement with the storage-article carrier.

The securing element, if present, is preferably located between the at least one engagement location and the traction drive or the pulling means.

There can be several transfer positions with the corresponding engagement locations. This is preferred, for example, if the extractor device is configured to pick up or deposit storage-article carriers on two opposite sides of the extractor device, particularly in the horizontal direction. Further transfer positions may be required if the storage positions in the storage system are at different distances from the extractor device.

The extractor device can have more than one traction drive or more than one carriage. For example, there may be a pair of traction drives spaced apart from each other in a width direction. In this case, the width direction extends in particular along a front edge of the storage-article carrier in the storage position.

The individual traction drives can jointly drive one or more carriages or each carriage can be driven by a separate traction drive which is guided around the at least one deflection location. There may also be two or more carriages that are driven by a common traction drive. Preferably, however, one carriage and/or one traction drive is assigned to each traction drive. For wide storage-article carriers in particular, it is advantageous if a traction drive and a carriage are provided on each of the two sides or ends of a storage position located in the width direction in order to be able to move the storage-article carrier out of or into the storage position without tilting. In this configuration, the extractor device therefore has a pair of carriages and traction drives.

If several traction drives are present, these should be arranged symmetrically to a vertical center plane of the storage-article carrier or the storage position in order to absorb any loads symmetrically and prevent the storage-article carrier from tilting.

If there are several traction drives, these can have a common drive or separate, synchronized drives.

Preferably, a separate securing device is assigned to each carriage or traction drive. If several securing devices are present, these are preferably synchronized, for example by means of a control unit. Furthermore, traction drives spaced apart from each other in the width direction can each be equipped with a securing device that can be actuated synchronously.

The extractor device can be part of an arrangement which has at least one storage-article carrier. In this context, the storage-article carrier is preferably provided with an engagement profile which is configured to complement the pulling means or a driver attached to the pulling means and can be brought into form-fitting engagement with the latter.

If, for example, a toothed belt, a roller chain or a toothed chain is used as the pulling means, the engagement profile can, for example, have an engagement profile that is complementary to the pulling means and can be brought into form-fitting engagement with the pulling means. Such a configuration has the advantage that the pulling means absorbs the forces that arise during the movement of the storage-article carrier along its longitudinal axis and thus as pure tractive forces. The pulling means does not twist. Moreover, additional drivers on the pulling means, such as those shown in DE 42 33 690 A1, can be dispensed with, which further reduces the space requirement.

In particular, if the pulling means has no form-fit elements, as is the case with V-belts or flat belts, for example, drivers can be attached to the pulling means which are configured to be brought into engagement with the engagement profile of a storage-article carrier. Such drivers can of course also be fitted to other types of traction means, for example chains or toothed belts. In the case of V-belts or flat belts, the pulling means can also be brought into frictional engagement with the storage-article carrier.

The storage system preferably has a storage shaft in which the extractor device is arranged to be movable, for example horizontally and/or vertically movable. The storage system can have one or more loading and/or removal stations at which storage articles and/or storage-article carriers receiving storage articles can be stored in the storage system or removed from the storage system. A loading and/or removal station may have one or more storage positions.

BRIEF DESCRIPTION OF THE DRAWINGS

In the following, the invention is explained in more detail with reference to an embodiment. In this context, the same reference signs are used for elements that correspond to each other in terms of function and/or structure.

According to the above embodiments, one or more features described above, which are not present in the embodiment shown and described, can be added to the embodiment if the technical effect associated with this feature is important for a particular application. Conversely, in accordance with the above description, individual features of the embodiment can also be omitted if the technical effect associated with the respective feature is not important for a particular application.

Figure 1:
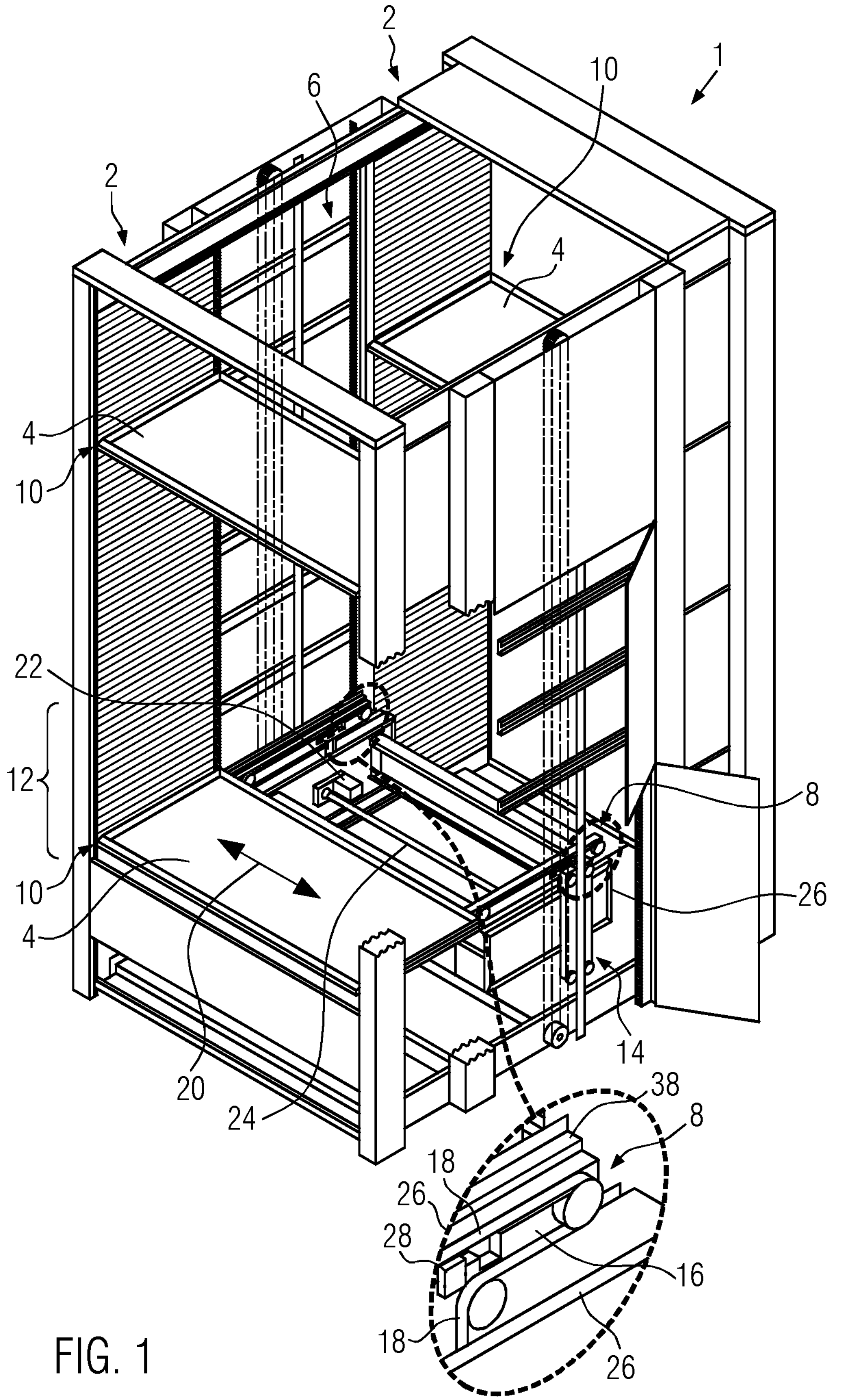
Figure 2:
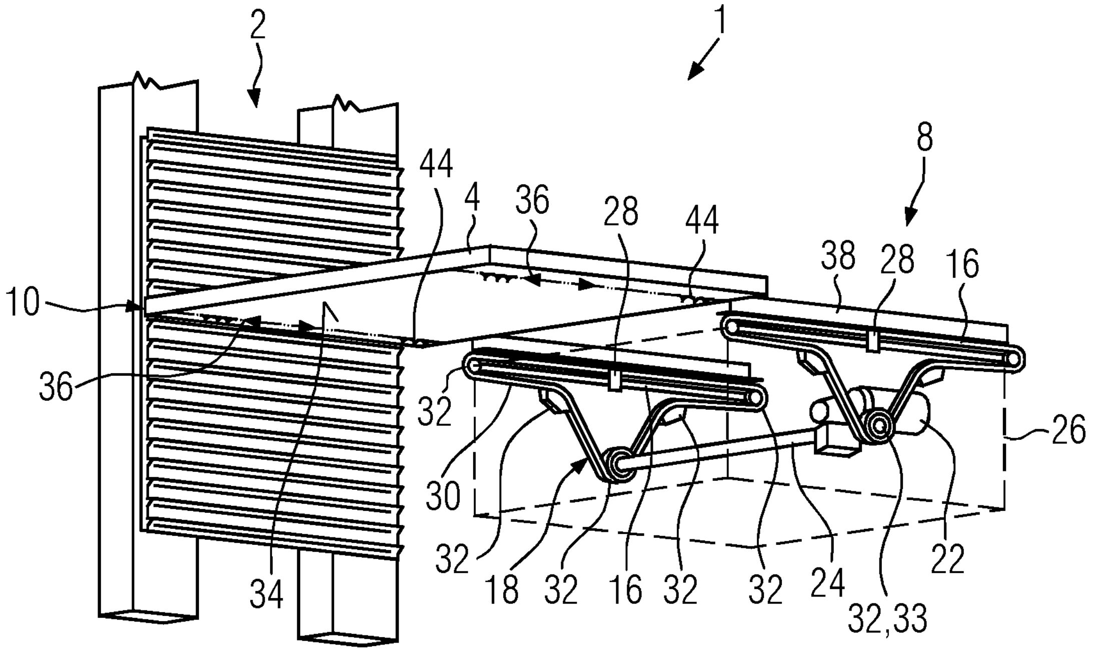
Figure 3:
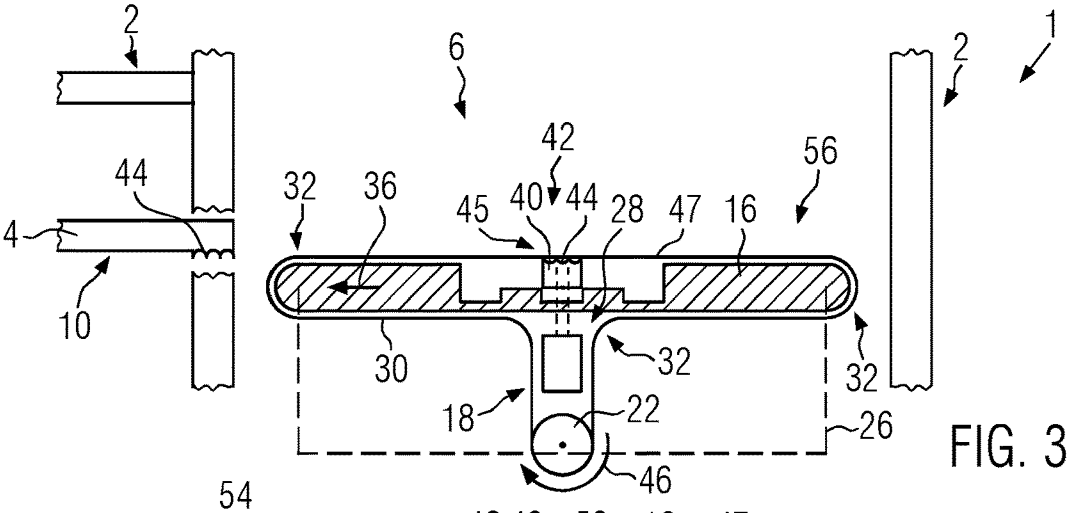
Figure 4:
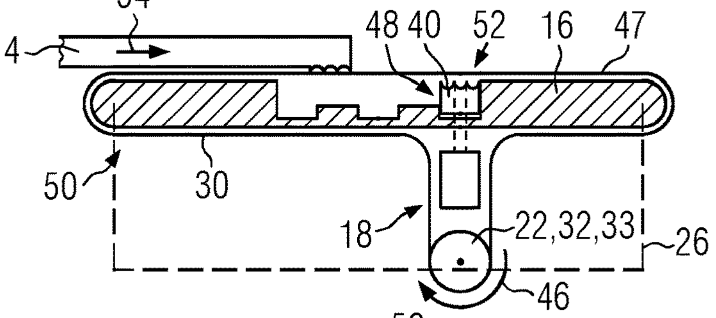
Figure 5:
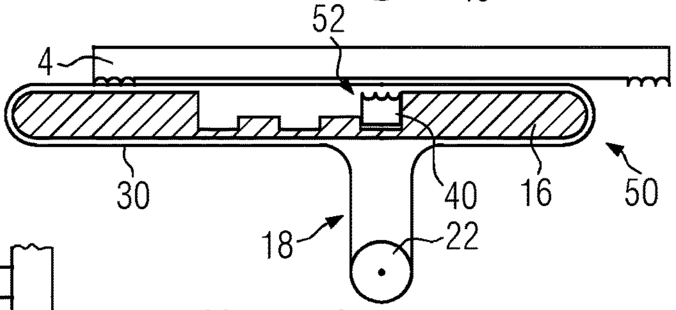
Figure 6:
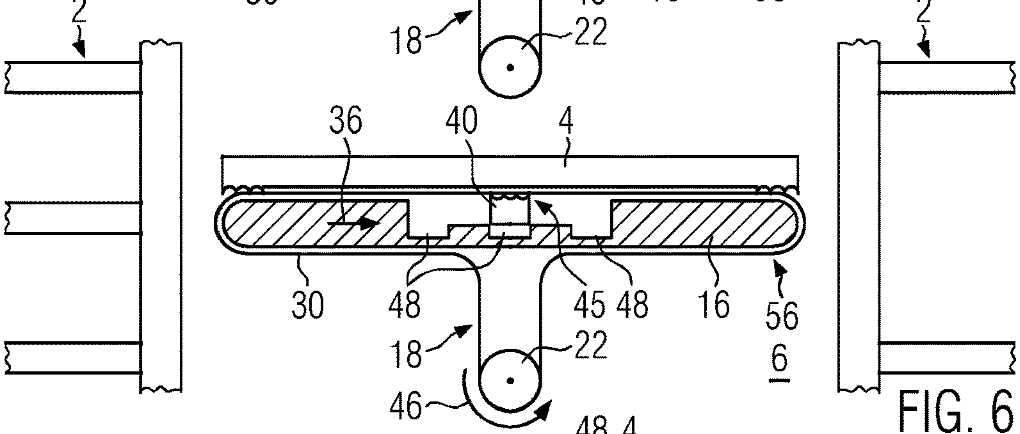
Figure 7:
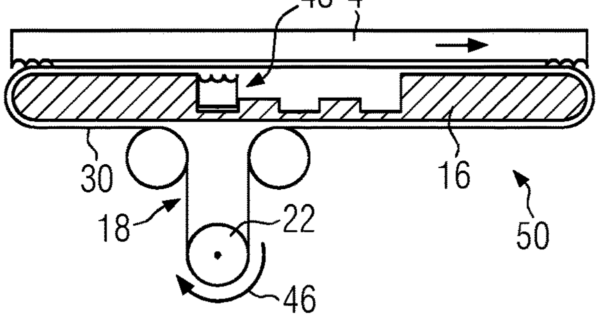
Figure 8:
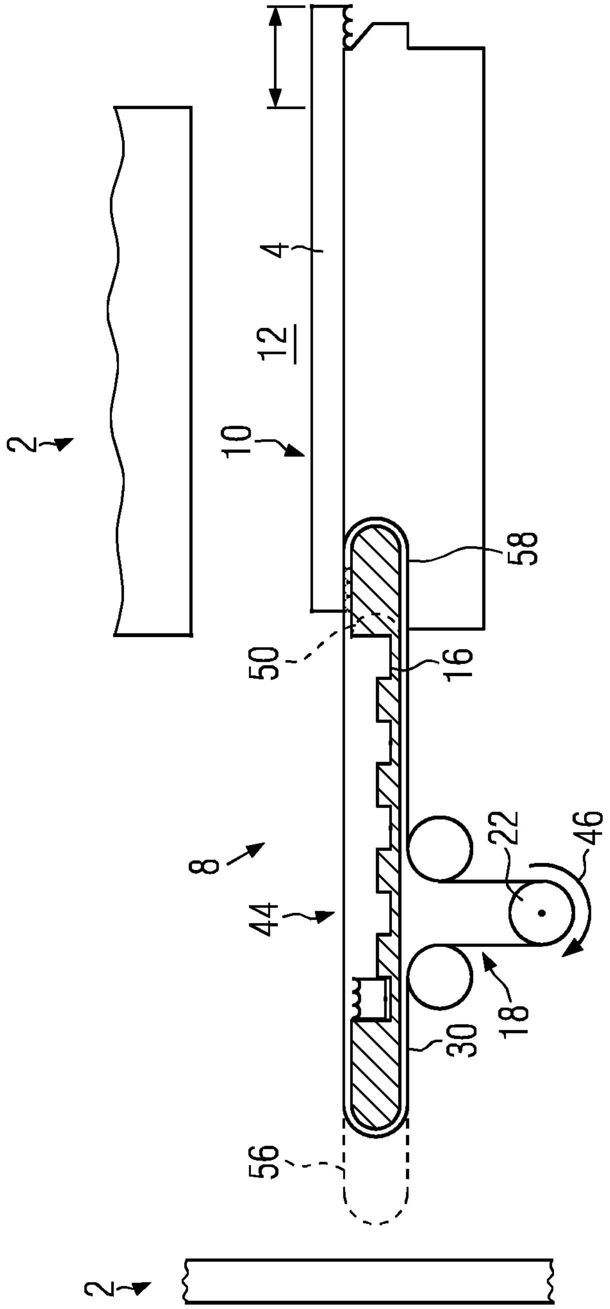

It is shown by:

FIG. 1 a schematic perspective view of an example of a storage system with an extractor device;

FIG. 2 a schematic perspective view of an extractor device;

FIG. 3 a schematic view of an extractor device in a first operating position;

FIG. 4 a schematic view of the extractor device of FIG. 3 in a further operating position;

FIG. 5 a schematic view of the extractor device of FIG. 3 in a further operating position;

FIG. 6 a schematic view of the extractor device of FIG. 3 in a further operating position;

FIG. 7 a schematic view of the extractor device of FIG. 3 in a further operating position;

FIG. 8 a schematic view of the extractor device of FIG. 3 in a further operating position.

DETAILED DESCRIPTION

A storage system 1, as shown as an example in FIG. 1, has a storage area 2 in which storage-article carriers 4 are stored. The storage-article carriers 4 are tray-shaped, for example, however they can also be trough-shaped or vat-shaped. In addition, a storage-article carrier 4 can also be configured in the form of a container, for example a small load carrier, or a pallet and/or comprise partitions.

The storage area 2 can, for example, be structured in the form of storage columns with storage shelves, which can be located opposite each other and/or next to each other in relation to a storage shaft 6. In the storage area 2, the storage-article carriers 4 are arranged one above the other in particular.

An extractor device 8 is located in the storage shaft 6, which serves, for example, to extract the storage-article carriers 4 from their respective storage position 10 in the storage area 2 and to move them either to another storage position 10 of the storage area 2 or to a loading and/or removal station 12, which also has at least one storage position 10. In the loading and/or removal station 12, the storage-article carrier 4 as a whole and/or storage articles (not shown) on the storage-article carrier can be stored in the storage system 1 or removed from the storage system 1. The storage system 1 can have several such loading and/or removal stations 12.

The extractor device 8 can be part of a conveyor system 14 and, in particular, can be movably driven up and down in the storage shaft 6 in order to reach different storage positions 10 lying one above the other. The extractor device 8 can also be horizontally movable as a whole in the storage shaft 6 if the storage shaft 6 is configured as a storage lane in which the storage positions 10 are arranged not only one above the other, but also next to each other.

In order to transfer a storage-article carrier 4, the extractor device 8 is configured to pull a storage-article carrier 4 from the storage position 10 into the storage shaft 6, towards the extractor device 8. In order to transfer a storage-article carrier 4 from the extractor device 8 to a storage position 10, the extractor device 8 is configured to push a storage-article carrier 4 into the storage position 10, away from the extractor device 8.

In order to move a storage-article carrier 4 from a storage position 10 or into a storage position 10, the extractor device 8 has at least one carriage 16 and a traction drive 18. The carriage 16 can be arranged in a plane, in particular a vertical plane, spanned by the traction drive 18 or next to it. In the embodiment shown, only two carriages are exemplarily provided spaced apart from one another in a width direction 20 of a storage-article carrier 4. The two carriages 16 are preferably located at the ends situated in the width direction 20 of a storage-article carrier 4 or a storage position 10. Each carriage 16 is preferably assigned its own traction drive 18. The carriages 16 and traction drives 18 preferably have the same mirror-symmetrical configuration. The structure and function of only one traction drive 18 with associated carriage 16 is therefore described below.

Of course, the carriage 16 can also extend in one piece in the width direction 20. However, this possibly leads to an unnecessarily high weight. Instead of a common drive, several separate drives can of course also be used, which are then synchronized by a corresponding control system, for example. The drive 22 is preferably the drive of the traction drive 18. Furthermore, two or more carriages 16 and traction drives 18 or two or more pairs of carriages 16 and traction drives 18 can also be arranged one above the other, so that the extractor device 8 can accordingly transport two or more storage-article carriers 4 one above the other at the same time.

If several carriages 16 and traction drives 18 are provided, their movements are preferably synchronized. This can be done mechanically, for example by providing a single common drive 22 which jointly drives the carriages 16 and the traction drives 18, for example via a common drive shaft 24 and/or a gear mechanism. Electronic synchronization by means of a control unit is also possible.

The carriage 16 and the traction drive 18 are arranged on the extractor framework 26. The drive 22 can be arranged on the extractor framework 26 or on the carriage 16. The carriage 16 and the traction drive 18 are movable with respect to the extractor framework 26.

The extractor device preferably has a securing device 28 by means of which the carriage 16 and, in sections, a pulling means 30 of the traction drive 18 can be alternately secured with respect to the extractor framework 26. The securing device 28 is attached to the extractor framework 26 and can selectably be brought into engagement with the carriage 16 or the pulling means 30.

If several carriages 16 and traction drives 18 are provided, a separate securing device 28 can be provided for each combination of carriage 16 and traction drive 18.

In the following, the structure of the extractor device 8 is exemplarily explained in more detail with reference to FIG. 2. In FIG. 2, the extractor framework 26 is only indicated schematically in order to provide a view of the carriages 16, the traction drive 18 and the securing device 28. FIG. 2 also shows a section of a storage area 2 with a storage-article carrier 4 in a storage position 10.

The pulling means 30 can be, for example, a toothed belt, a roller chain or a toothed chain. V-belts or flat belts can also be used as pulling means 30. The pulling means 30 is preferably endless or closed in the shape of a ring. The pulling means 30 is deflected at deflection locations 32, which can be configured in the form of rollers, gearwheels, pulleys or sliding shoes. At least one, preferably two or more deflection locations 32 are arranged stationary on the carriage 16. This at least one deflection location 32 moves with the carriage. If two or more deflection locations 32 are arranged on the carriage 16, these are preferably spaced apart from one another in the horizontal direction.

At least one deflection location 33 is attached to the extractor framework 26. In particular, the deflection location 33 may be a drive wheel of the traction drive 18. The drive 22, which drives the traction drive 18, is preferably also arranged stationary on the extractor framework 26.

The carriage 16 is guided translationally with respect to the extractor framework 26, preferably in a direction parallel to a storage plane 34 in which a storage-article carrier 4 is located in its storage position 10 and preferably perpendicular to the width direction 20 or perpendicular to a front edge of a storage-article carrier 4 located towards the storage shaft in its storage position 10.

In FIG. 2, the direction of movement 36 of the carriage 16 is indicated by a double dash-dotted line. The two deflection locations 32 on the carriage 16 are located between two sections of the pulling means 30 in the direction of movement 36. The drive 22 preferably engages on the pulling means 30 between the two deflection locations 32.

During transportation of the storage-article carrier 4 in the storage shaft 6, the storage-article carrier 4 is supported by the extractor device 8. For this purpose, the extractor device 8 can have load supports 38 which absorb the weight of the storage-article carrier 4 when it is located on the extractor device 4 or is moved towards or away from the extractor device 8. The load supports 38 can, for example, be configured as a platform or as rails, in particular as bearing brackets. Preferably, the load support 38 is stationary with respect to the extractor framework 26. Alternatively or additionally, the weight of the storage-article carrier 4 can also be borne by the carriage 16 and/or the traction drive 18.

As is described below with reference to FIGS. 3 to 7, depending on whether the carriage 16 or at least a portion of the pulling means 30 is blocked with respect to the extractor device 8, either the pulling means 30 rotates with the carriage 16 stationary with respect to the extractor framework 26 or the traction drive 18 moves the carriage 16 with respect to the extractor framework 26.

In FIGS. 3 to 7, parts of the extractor device 8 are not shown in order to illustrate the interaction of the carriage 16, traction drive 18 and securing device 28 more clearly. If several carriages 16 and traction drives 18 are provided, as shown for example in FIGS. 1 and 2, the illustrations in FIGS. 3 to 7 apply to each individual carriage 16 and the associated traction drive 18. A separate securing device 28 can be assigned to each carriage 16 and traction drive 18 or a securing device 28 is assigned to several carriages 16 and traction drives 18.

FIG. 3 shows that the securing device 28 has a securing element 40 which is in engagement with the pulling means 30 in the first securing position 42 shown here. For this purpose, the securing element 40 can be configured complementarily to the pulling means 30, at least in sections. For example, the securing element 40 can thus be provided with an engagement profile 44 which is complementary to a toothed belt, a roller chain or a toothed chain as the pulling means 30 and thus creates a form fit.

The at least one portion 45 of the pulling means 30, at which the securing element 40 comes into engagement with the pulling means 30, is preferably located between the two deflection locations 32 of the carriage. One deflection location 32 is arranged between the portion 45 and the drive 22.

If the drive 22 now drives the pulling means 30 in the direction of rotation or drive direction shown by the arrow 46 in FIG. 3, the carriage 16 is moved in the direction of movement 36 via the deflection locations 32 as in a track chain, in this case towards a storage-article carrier 4, which is located in a storage position 10 in the storage area 2. The working strand with the portion 45 is stationary in the first securing position 42 in the direction of movement 36 of the carriage 16, it does not rotate, but is unwound or wound up by the deflection locations 32.

Accordingly, in the first securing position 42, the traction drive 18 drives the carriage 16 with respect to the extractor framework 26. In this way, the carriage 16 can move under the storage-article carrier 4 until the pulling means 30 comes into engagement with a complementary engagement profile 44 on the storage-article carrier 4. The storage-article carrier 4 thereby comes into engagement with the working strand of the pulling means 30. The pulling means 30 is therefore unwound on the storage-article carrier without moving in its longitudinal direction relative to the pulling means 30.

Additional drivers of the pulling means 30, as shown for example in DE 42 33 690 A1, can be dispensed with if the storage-article carrier 4 is provided with an engagement profile 44 which is configured complementarily to the pulling means 30 and which can come into form-fitting engagement in particular with a working strand 47 of the pulling means 30. When the carriage 16 is brought into horizontal or vertical overlap with the storage-article carrier 4, the engagement between the engagement profile 44 on the storage-article carrier side and the pulling means 30 results preferably automatically. The engagement profile 44 can, for example, be a toothed profile that is complementary to a roller chain and can be brought into engagement with it. Instead of a form fit, a frictional connection can also be created between the pulling means 30 and a storage-article carrier 4. For this purpose, the surfaces of the pulling means and/or storage-article carrier that can be frictionally brought into engagement can be provided with a surface texture that promotes friction, for example with a roughness that is greater than that of adjacent surfaces that cannot be frictionally brought into engagement.

It is preferred that when the pulling means 30 is blocked in sections with respect to the extractor framework, the working strand 47 of the storage position 10 or with respect to the extractor framework 26 and thus also with respect to the storage position 10 stands still. This facilitates the engagement between the pulling means 30 and the storage-article carrier 4 and reduces the dynamic loads.

As soon as the pulling means 30 and the storage-article carrier 4 have come into engagement with each other, the blocking of the pulling means 30 with respect to the extractor framework 26 is released and the carriage 16 is secured with respect to the extractor framework 26 instead. This can be done, for example, by disengaging the securing element 40 from the pulling means 30 and bringing the securing element 40, or another securing element 40, into engagement with the carriage 16. For this purpose, the carriage 16 can have an engagement location 48 at which the securing element 40 can be brought into engagement with the carriage 16 and then blocks it with respect to the extractor framework 26. Such an engagement location 48 may be associated with a predetermined position of the carriage 16 relative to the extractor framework 26, for example a transfer position 50 in which the pulling means 30 is currently in engagement with a storage-article carrier 4 in a storage position 10. Such a transfer position 50 is shown in FIG. 4. The securing element 40 can therefore only block the carriage 16 when it is in the predetermined position, in this case the transfer position 50.

In FIG. 4, the securing device 28 is in a second securing position 52, in which the carriage 16 is blocked with respect to the extractor framework 26.

With the carriage 16 blocked with respect to the extractor framework 26, the pulling means 30 rotates in the drive direction 46, so that due to the engagement with the storage-article carrier 4, the storage-article carrier 4 is moved relative to the carriage 16 onto the extractor device 8. The storage-article carrier 4 is moved by the pulling means 30 in an extraction direction 54 from the storage position 10.

This movement is continued until the storage-article carrier 4 is completely in the storage shaft 6. This position is shown in FIG. 5. The carriage 16 remains in the transfer position 50.

The blocking of the carriage 16 is then released and the pulling means 30 is blocked with respect to the extractor framework 26 instead. This is done, for example, by transferring the securing device 28 from the second securing position 52 back to the first securing position 42. In particular, the securing element 40 is moved out of engagement with the carriage 16 and into engagement with the working strand 47 of the pulling means 30.

By blocking the pulling means 30, the carriage 16 is again driven by the pulling means 30 in the manner of a track chain, as in FIG. 3. Starting from the transfer position 56 shown in FIG. 5 with the storage-article carrier 4 stationary, the carriage 16 thus moves, for example, centrally under the storage-article carrier 4 or into the storage shaft 6 until the transport position 56 shown in FIG. 6 (and FIG. 1) is reached. In the transport position 56, the extractor device 8 together with a storage-article carrier 4 located on it in the storage shaft 6 can be moved to another storage position 10, for example. In the transport position 56, the blocking of the pulling means 30 can then be released again and instead the carriage 16 can be blocked relative to the extractor framework 26. For this purpose, a further engagement location 48 can be assigned to the transport position 56.

In order to transfer a storage-article carrier 4 from the transport position 56 back to a storage position 10, the steps shown with reference to FIGS. 3 to 5 are carried out in the reverse direction, wherein the storage position 10 can be located on any side of the extractor device 8. For this purpose, the carriage 16 expediently has a further engagement location 48 at which the carriage 16 is blocked in a further transfer position 50, which is preferably arranged symmetrically with respect to the transport position 56 on the other side of the extractor device 8, as FIG. 7 shows.

The engagement locations 48 of FIGS. 3 to 7 are spaced apart from one another according to the distance between the transfer positions 50 and the transport position 56. In this configuration, the carriage 16 can only be secured at one engagement location 48. Different engagement locations 48 can be provided for different tray depths.

FIGS. 3 to 7 merely serve to provide a functional description of the extractor device 8, a limitation to the structural configuration shown there is not intended. Thus, the coupling device 28 can not only move the securing element 44 in a translational manner, as shown. Instead, or in addition, a rotational or pivot movement of the securing element 40 is also possible, for example if this is arranged on a lever or wheel and/or guided in a guide, for example a link guide. The drive of the securing element 44 can be magnetically, electromotively, hydraulically and/or pneumatically driven.

Blocking of the carriage 16 or the traction drive 18 relative to the extractor framework 26 does not necessarily have to be based on a form fit. Alternatively, a frictional connection is also possible. A frictional connection offers the advantage that the carriage 16 or traction drive 18 can be secured at any point. However, this may require more effort to monitor the position of carriage 16 and/or traction drive 18.

The securing device 28 does not have to form a structural unit. For example, the securing device 28 can also have several individual devices arranged spaced apart from one another. For example, the securing device 28 can thus have in each case structurally separate couplings or brakes for a carriage 16 and a traction drive 18, which are actuated alternately. One of the two couplings is used exclusively for blocking the carriage, while the other of the two couplings is used exclusively for blocking the traction drive 18.

Moreover, the blocking of the traction drive 18 does not have to be achieved by engaging the pulling means 30. It is also possible to block the pulling means 30 indirectly, for example by blocking at least one gearwheel or roller that is in engagement with the pulling means 18 and is driven by the pulling means 18. The blocked roller or the blocked gearwheel is preferably attached to the extractor framework 26.

The securing element 40 can be configured to latch automatically into an engagement location 48 of the carriage 16 as soon as it is released from the pulling means 30. This allows the carriage 16 to be automatically secured in the predetermined position assigned to the engagement location 48.

The positions of securing element 40 and engagement locations 48 can also be reversed compared to the above illustration. Thus, the securing element 40 can be located on the carriage 16 if the engagement locations 48 are arranged on the extractor framework 26.

FIG. 8 shows a further configuration of the extractor device 8. The extractor device 8 of FIG. 8 has at least one further engagement location 48, in which the carriage 16 is blocked in at least one access position 58. In the access position 58, the carriage 16 is extended further with respect to the transfer position 50, thus further away from the extractor framework 26. The transfer position 50 is therefore located between the transport position 56 and the access position 58. This allows the storage-article carrier 4 to be moved further in a direction away from the extractor device 8, for example in a loading and/or removal station 12. As a result, the rear areas of the storage-article carrier 4 facing the extractor device 8 can be accessed more conveniently by an operator in the area of the loading and/or removal station 12. The number and arrangement of the access positions 58 is arbitrary. Thus, for example, an access position 58 can be provided only on one side of the transport position 56.

On the side that is opposite with respect to the transport position 56, only one transfer position 50 with the corresponding engagement location 48 is provided in such a configuration, for example. This can be the case in particular if at least one loading and/or removal station 12 is provided on only one side of the storage shaft 6.

If loading and/or removal stations 12 are located on opposite sides of the storage shaft 6, access positions 58 with the corresponding engagement locations 48 can also be arranged on both sides of the transport position 56.

REFERENCE SIGNS

1 storage system
2 storage area
4 storage-article carrier
6 storage shaft
8 extractor device
10 storage position
12 loading and/or removal station
14 conveyor system
16 carriage
18 traction drive
20 width direction
22 drive
24 drive shaft
26 extractor framework
28 securing device
30 pulling means
32 deflection location
33 deflection location on the extractor framework
34 storage plane
36 direction of movement of the carriage
38 load support
40 securing element
42 first securing position
44 engagement profile
45 portion at which the pulling means comes into engagement
46 drive direction
47 working strand
48 engagement location
50 transfer position
52 second securing position
54 extraction direction
56 transport position
58 access position

The invention claimed is:

1. An extractor device for transferring a storage-article carrier from or into a storage position of a storage system, having a carriage, with a traction drive which has a pulling means and at least one deflection location, located on the carriage, for the pulling means, with an extractor framework, on which the carriage and the traction drive are movably arranged, and with a securing device, by means of which selectably at least one portion of the pulling means or the carriage is blocked with respect to the extractor framework.

2. The extractor device according to claim 1, wherein the extractor device has a drive by means of which when the at least one portion of the pulling means is blocked with respect to the extractor framework, the carriage can be moved relative to the extractor framework and when the carriage is blocked with respect to the extractor framework, the traction drive can be moved relative to the extractor framework.

3. The extractor device according to claim 1, wherein when the at least one portion of the pulling means is blocked with respect to the extractor framework, the carriage is moved relative to the extractor framework by the traction drive.

4. The extractor device according to claim 1, wherein the securing device is arranged on the extractor framework and is configured such that it can be brought alternately into engagement with the carriage or the traction drive.

5. The extractor device according to claim 1, wherein the securing device is configured to be switchable between a first securing position and a second securing position, wherein in the first securing position the at least one portion of the pulling means is secured with respect to the extractor framework and the carriage is drivable with respect to the extractor framework by the traction drive, and wherein in the second securing position the carriage is secured with respect to the extractor framework and the pulling means is drivable in rotation with respect to the carriage.

6. The extractor device according to claim 1, wherein the securing device and/or the carriage is arranged in an area looped by the pulling means.

7. The extractor device according to claim 1, wherein a plurality of engagement locations spaced apart from each other is provided, at which the carriage can be blocked relative to the extractor device.

8. The extractor device according to claim 1, wherein the securing device has a translationally and/or rotationally movable securing element which can be brought alternately into engagement with the traction drive and the carriage.

9. The extractor device according to claim 1, wherein the carriage has a plurality of positions at which it can be secured with respect to the extractor framework by the securing device.

10. The extractor device according to claim 1, wherein the extractor device comprises at least one pair of traction drives and/or carriages arranged parallel to and spaced apart from each other.

11. The extractor device according to claim 1, wherein at least two deflection locations are arranged on the carriage and at least one deflection location is arranged on the extractor framework.

12. An arrangement having an extractor device according to claim 1, wherein the traction drive has a pulling means, and having at least one storage-article carrier which has an engagement profile which can be brought directly into engagement with the pulling means.

13. A storage system with an extractor device according to claim 1, wherein the storage system has a storage shaft and a plurality of storage positions which adjoin the storage shaft, wherein the extractor device is arranged in the storage shaft so as to be movable horizontally and/or vertically past the storage positions.

14. A method for transferring a storage-article carrier from a storage position of a storage system to an extractor device and/or from the extractor device to the storage position by means of a traction drive having a pulling means and a carriage deflecting the pulling means, which are both arranged movably on an extractor framework of the extractor device, wherein selectably the carriage is blocked relative to the extractor framework and the storage-article carrier is moved by means of the traction drive, or at least a portion of the pulling means is blocked relative to the extractor framework and the carriage is moved by the traction drive.

15. The method according to claim 14, wherein first the carriage is moved by the blocked traction drive to the storage position, then the storage-article carrier is moved by the traction drive towards or away from the extractor framework when the carriage is blocked, and then the carriage is moved in a direction of the extractor framework by the blocked traction drive.

* * * * *